United States Patent
Centers et al.

(10) Patent No.: US 7,188,730 B2
(45) Date of Patent: Mar. 13, 2007

(54) SEPARATION SYSTEM FOR SINGLE STREAM COMPRESSED RECYCLABLES

(76) Inventors: Michael C. Centers, 94 Ramona Rd., Danville, CA (US) 94526; Stephen A. Young, 1159 Norumbga Rd., Monrovia, CA (US) 91016

( * ) Notice: Subject to any disclaimer, the term of this patent is extended or adjusted under 35 U.S.C. 154(b) by 145 days.

(21) Appl. No.: 10/671,027

(22) Filed: Sep. 24, 2003

(65) Prior Publication Data

US 2005/0061716 A1    Mar. 24, 2005

(51) Int. Cl.
*B07B 1/28* (2006.01)
*B07B 9/00* (2006.01)

(52) U.S. Cl. ............... 209/314; 209/311; 209/930; 209/235; 209/240; 209/138; 209/30; 209/36; 209/38

(58) Field of Classification Search ........ 209/309–314, 209/21, 28, 930, 235, 240, 241, 255–257, 209/138, 139.1, 142, 659, 19, 30, 31, 34–38
See application file for complete search history.

(56) References Cited

U.S. PATENT DOCUMENTS

| | | | | |
|---|---|---|---|---|
| 3,986,949 A | * | 10/1976 | Di Duca et al. ............... 209/35 |
| 4,636,305 A | * | 1/1987 | Mueller ....................... 209/312 |
| 4,652,362 A | * | 3/1987 | Mueller ....................... 209/44.2 |
| 4,678,560 A | * | 7/1987 | Stole et al. .................... 209/23 |
| 4,913,804 A | * | 4/1990 | Muller ........................ 209/44.2 |
| 5,098,557 A | * | 3/1992 | Hirschler et al. ............... 209/29 |
| 5,476,109 A | * | 12/1995 | Coleman et al. ......... 131/109.2 |
| 5,649,785 A | * | 7/1997 | Djerf et al. ............ 405/129.27 |
| 5,875,898 A | * | 3/1999 | Fry ............................. 209/28 |
| 5,984,105 A | * | 11/1999 | Lease et al. .................. 209/37 |
| 6,460,706 B1 | | 10/2002 | Davis | |
| 2003/0116486 A1 | | 6/2003 | Davis | |

* cited by examiner

*Primary Examiner*—Patrick Mackey
*Assistant Examiner*—Mark Hageman
(74) *Attorney, Agent, or Firm*—Fernandez & Associates, LLP

(57) ABSTRACT

A screening system designed to provide separation of multiple fractions of New Screens Fines. News Screens Fines ("NSF") contain a mix of compressed, unmarketable recyclables that are generally less than four inches in size created as a by-product of current Material Recovery Facility (MRF) plant designs used to process single-stream recyclables. The NSF separation system uses a series of primary and secondary classification apparatus to separate materials into marketable products that meet legislative requirements. A series of screens, conveyors and air moving systems are designed to separate waste from fractions of glass, plastic and ferrous metals that can be sold.

6 Claims, 6 Drawing Sheets

News Screen Fines System Flow Diagram

SEPARATION SYSTEM FOR SINGLE STREAM COMPRESSED RECYCLABLES

FIELD OF THE INVENTION

The present invention relates to apparatus and methods used for processing single-stream commingled recyclable materials, and more particularly, how to separate marketable fractions of recycled material by-product.

BACKGROUND OF THE INVENTION

Material recycling has become an important industry in recent years due to decreasing landfill capacity, environmental concerns and dwindling natural resources. Many industries and communities have adopted voluntary and mandatory recycling programs for reusable materials. Until recently, most trash collection efforts delivered waste materials, separated at the source, e.g. by the home owner, to the Material Recovery Facilities (MRF). In an effort to improve the economies of collecting garbage for recycling, many municipalities have changed from curbside source-separated to commingled recycling methods. Solid waste and trash that are collected from homes, apartments or companies now are combined in one container. When brought to a waste processing center, or MRF, the recyclable materials are frequently mixed together in a heterogeneous mass of material. These mixed recyclable materials include newspaper, magazines, mixed paper, cardboard, aluminum cans, plastic bottles, glass bottles and other materials that may be recycled. Changes in MRF design were required to handle the new commingled material.

U.S. Application #20030062294 (1) is an example of equipment developed to separate what is termed "single-stream" waste into fractions which have economic value. The single most valuable recyclable waste product is newspaper and other paper based product. The products of CP Manufacturing, as exemplified in the above application and also in U.S. Pat. No. 6,460,706 (2), are focused primarily on recovering paper, plastic containers and metal cans. These items may represent 70 to 90% of the economic value in recyclable waste as it is constituted today.

The advent of this equipment, by the nature of its operation, created its own waste by-product which is typically sent to a landfill. This material is referred to as "−4 inch news screens fines" (NSF). It is aggregates of compressed waste which fall through the first operation of the conventional disc screening method; based on the separation of the discs it is less than 4 inches in at least two dimensions; these dimensions vary somewhat with the particular equipment and operator. This material is a combination of glass, paper, metallic objects and general refuse, including food wastes. Historically, no equipment or process has been available to process this trash for sufficient residual value and hence the disposition to a landfill. There is an environmental need to reduce the amount of waste going to landfills and a need to compensate the MRF operator for this service.

SUMMARY OF THE INVENTION

The invention separates sub-four inch news screen fines, NSF, into fractions with economic value. The NSF Separation System recovers sufficient material of value to provide a return on investment to the purchaser in less than one year. The economic return is based on credits to MRF's from unredeemed funds for glass or metal containers in curbside recycling systems in states or countries which charge a deposit on those containers. The NSF system classifies fractions of materials through a combination of vibratory screening, conveying, and air movement apparatus to separate the waste and recover a high percentage of the portions that can meet the locale's recycling requirements.

The NSF Separation System can be configured as an addition to a conventional single stream processing system or stand by itself or be configured as a portable system. As a portable system, it can be used to provide audits of the composition of the sub four inch portion of a waste stream. The invented system may be modified to handle waste material with dimensions larger than four inches if desired; the invention has several optional configurations as one knowledgeable in the art will appreciate.

DESCRIPTION OF THE PREFERRED EMBODIMENTS

The sequence of operations is part of the novelty of the invention. As detailed in FIG. 1 the waste stream is segregated by size. The initial classification of the sub 4 inch material is for the less than 2.5 inch fraction to be separated by falling through the screen, FIG. 1, step (105), the beginning of the invented portion of the NSF Separation System. Since the "sub four inch material" is the first fallout of a disc-based operation the actual dimensions of the compressed material may vary from somewhat less than four inches to somewhat more than six inches. The initial screen size, herein set at 2.5 inches, may be somewhat smaller or larger depending on the characteristics of the particular machine producing the compressed waste. The larger fraction, Fraction 2, continues past the screen and returns to the beginning of the NSF system for further processing or, optionally, is discarded, FIG. 1, step (106–108). Historically it has been found that the material of value is primarily the high density material in the smaller dimensions, such as below three inches. In addition, it is important that a vibratory screen be used as opposed to a disc based system; the vibratory screen helps separate the compressed material. Current disc systems have difficulty processing small dimension waste, particularly glass.

Figure 1:
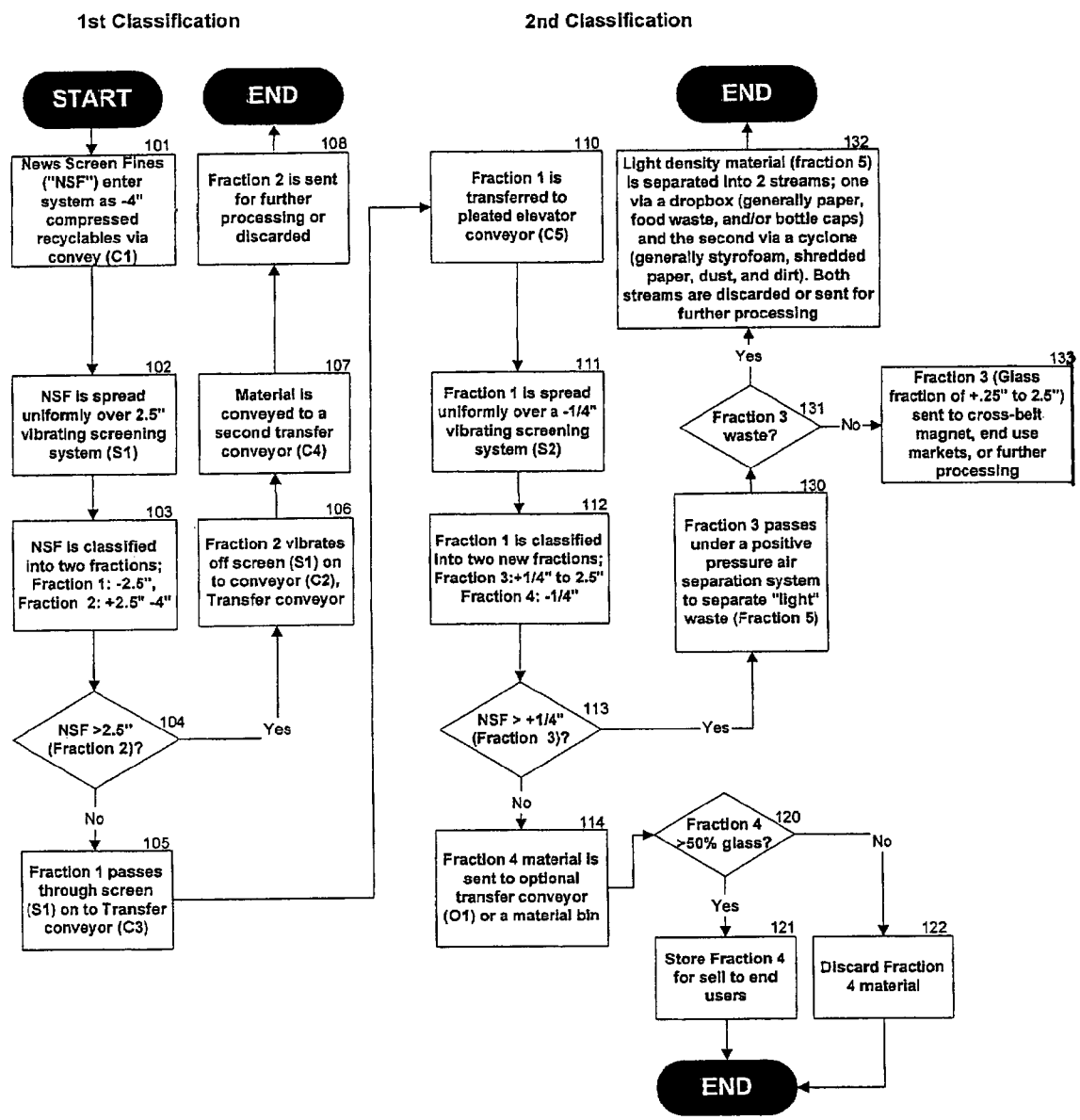
FIG. 1 is a flow diagram of the steps for the first two classifications carried out by the NSF Separation System.

The material stream, Fraction 1, continues through the NSF Separation System FIG. 1, step (112). In this section an unusually small screen is used; 0.25 inch is preferred. Sizes as large as one inch may be used depending on the nature of the material stream. The nature of the conveyor and vibratory action of the screen spread the material across the screen which is preferably about a 48 inches wide screen which is fed by about a 24 inch conveyor. The material dimensioned smaller than the screen size of 0.25 in. falls through, FIG. 1, step (113) and is separated from the larger material. The larger material now proceeds to flow under a pneumatic separator, FIG. 1, step (130). The embodiment of the invention as a portable apparatus for auditing curbside streams is substantially the same except all dimensions of the frames and conveyors are reduced; the classification sequence and screen sizes stay the same.

By removing material smaller than one quarter inch first, pneumatic separation of the larger dimensioned material is facilitated. In removing the ¼ inch portion via a shaker screen, the larger material is further separated across a 4 foot screen ensuring separation of high density material from light density material. Upon reaching the end of the screen, the material, across the complete length of the screen, falls into an air chamber, a pneumatic separator. The pneumatic separator has a novel design; using positive pressure air being pushed from below as well as air being extracted from above, the waste stream enters the air chamber, or pneumatic chute, and is classified as "light" or "heavy". The absence of the smaller fines reduces the load on the pneumatic separator and subsequently the cost of operation. The chute design into the pneumatic separator ensures an even distribution of material already pre-separated by the shaker screen. In this step the "light fraction" passes up the pneumatic chute and the "heavy" fraction falls down. By having two independent streams of air a level of control over what material is removed, up, and what material goes down is achieved. This level of control can be adjusted by increasing or decreasing the air pressure on both the positive and negative air blowers using a variable speed drive. Adjustments to air are necessary given the material stream changes from season to season based on weather, holidays and seasonal variations. This pneumatic separator removes a very large fraction of the low density, paper and light waste products, portion of the stream by sending it up the chute and out of the main stream, FIG. 1, step (132).

Using this novel sequence of steps, starting with about 4 inch material, a first classification, followed by a second classification for the small material, for instance less than one inch, achieved by using a shaker screen which further separates material prior to entering the air chamber followed by the pneumatic separation, high throughputs can be achieved. Conventional equipment which does not remove the small fraction in the second classification achieves processing rates of about two tons per hour. A prototype of the invention has achieved 16 tons per hour The smaller fraction, FIG. 1, step (114) falls to another conveying system or bin. This smaller fraction usually meets a minimum 50% glass content requirement which has sufficient economic value to avoid landfill disposal. This sub-quarter inch stream is typically about 10% of the total sub-four inch stream. The removal of this sub-quarter inch portion substantially reduces the cost of processing the glass and metal content of the remaining stream, Fraction 3+Fraction 5, as well as increasing overall separation efficiency of the NSF Separation System.

Typically, the "heavy" portion, Fraction 3, of the "+0.25 in. and −2.5 in." fraction has value and is sent to be further classified by additional metal and air separation apparatus or other classification options, FIG. 1, step (133) and beyond, not shown. Additional classification options include crossbelt magnet for metallic content and its removal, ceramic detection equipment and/or color separation creating a flint fraction and a colored fraction of glass. This heavy portion is classified to several portions, one of which is not less than 90% glass resulting in an economic return for material recovery facilities in bottle bill states where redemption or CRV is reimbursable for curbside operations. The metal and plastic portion have economic value and are recovered.

Figure 2:
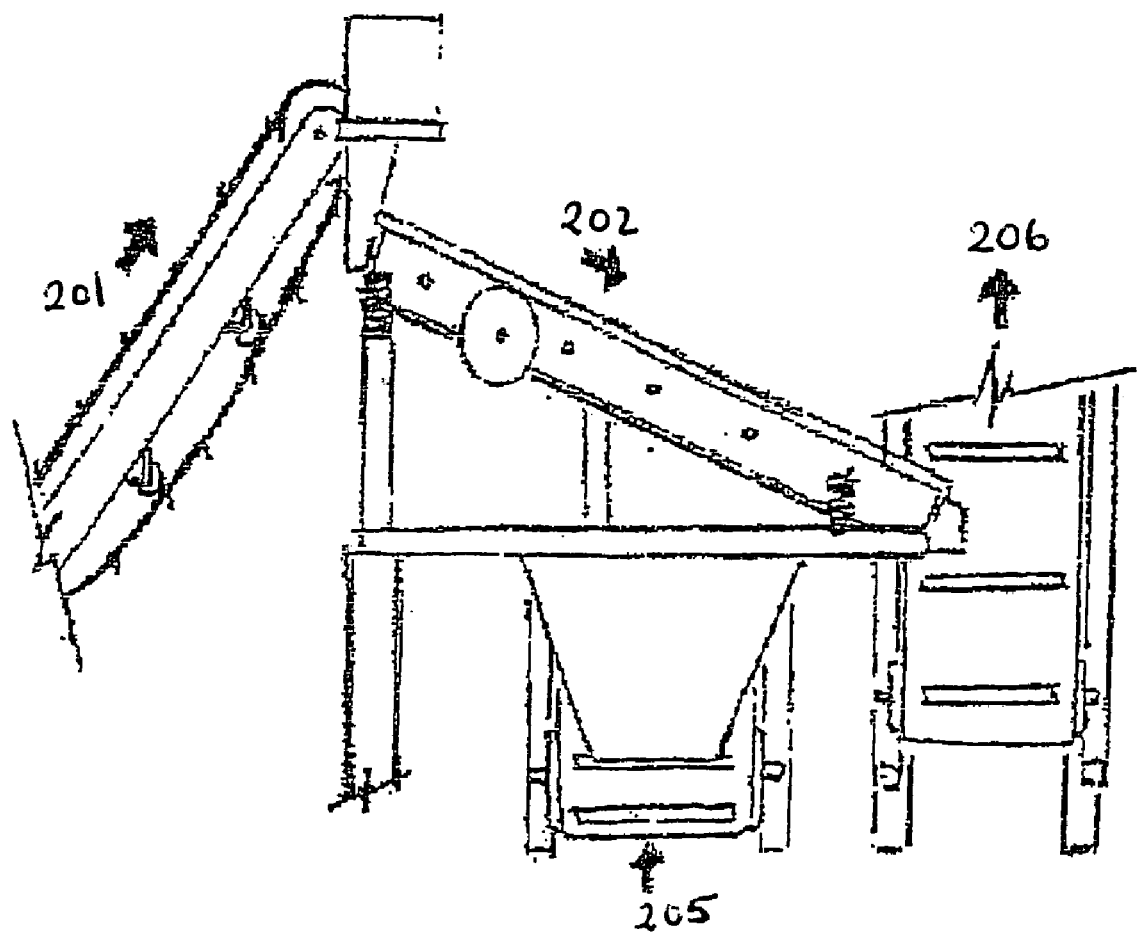
FIG. 2 is a side elevation of the screening system (S1) of the present invention.

FIG. 2 is a side elevation view, figuratively, of the preferred embodiment of the present recycling invention comprising a vibrating screen system (202), and supporting delivery (201) and removal conveyors (206 and 205). The screening system is designed to classify the −4 inch news screen fines (NSF) compressed recyclable material into a less than 2.5 inch fraction (Fraction 1) present at (205) and greater than 2.5 inch fraction (Fraction 2) on to conveyor (206) corresponding to step 106 of FIG. 1. Depending on the material stream, preferred separation screen sizes for screen 1 (S1) may range between 2.5 inches and about 4 inches.

Figure 3:
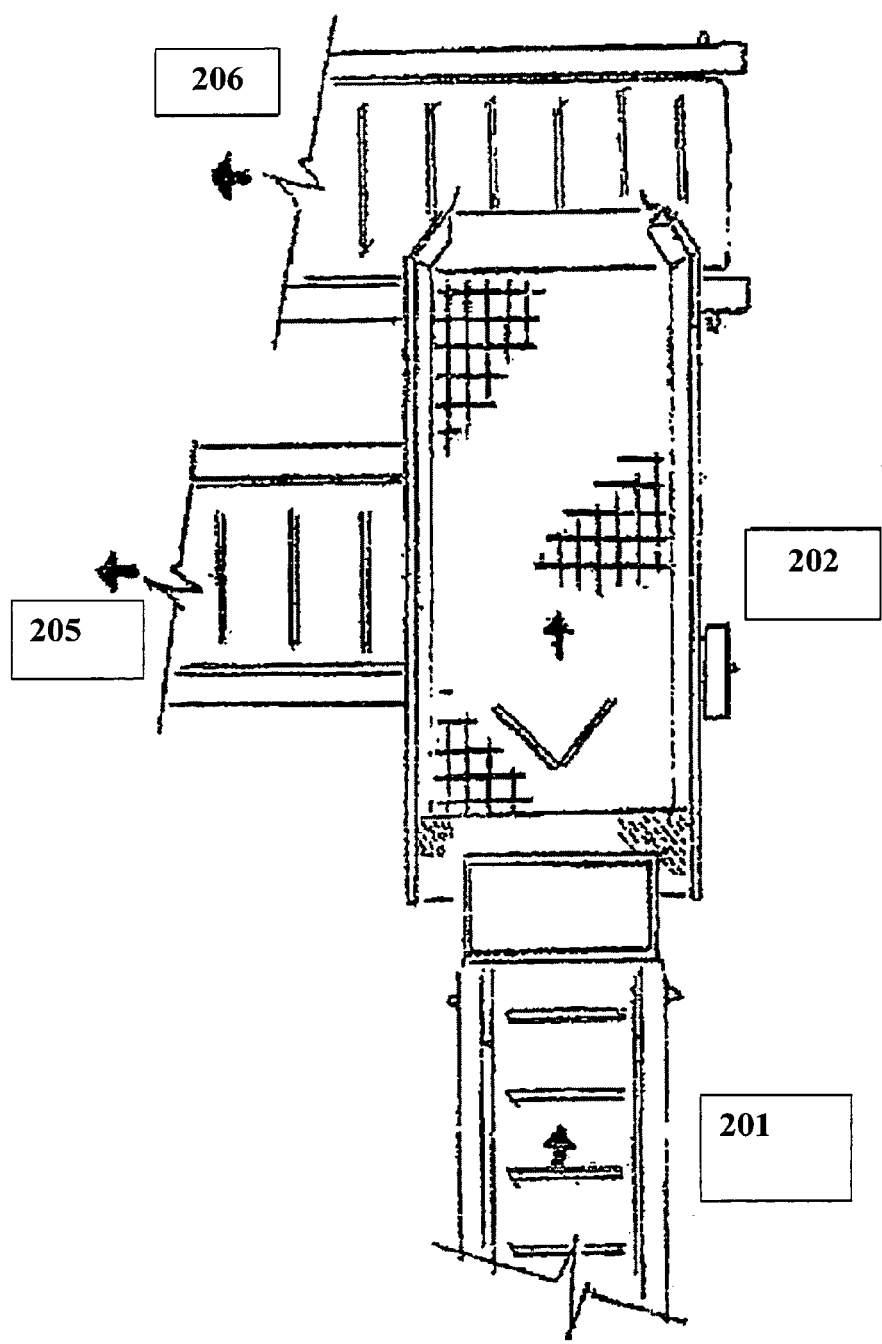
FIG. 3 is a top view of the screening system (S1) of the present invention.

FIG. 3 is a top view of the same equipment as FIG. 2. Material enters a recycling apparatus by a conveyor 201 as in step 101 of FIG. 1; is deposited on the uppermost region of the screen 202; is spread uniformly over the screen using a v-shaped metal separator welded onto the screen 12 inches from the deposit location. Separation occurs as the material moves longitudinally across the vibrating mesh screen surface which has been set at a size of 2.5 inches. The angle of the system design is optional and depends on design flow rate. Fraction 1, the less than 2.5 inch portion, is carried to the second classification by a conveyor 205. Fraction 2, the greater than 2.5 inch portion, is returned to a single stream sorting system or discarded by conveyor (206) and (C4) of step (107), not shown.

Figure 4:
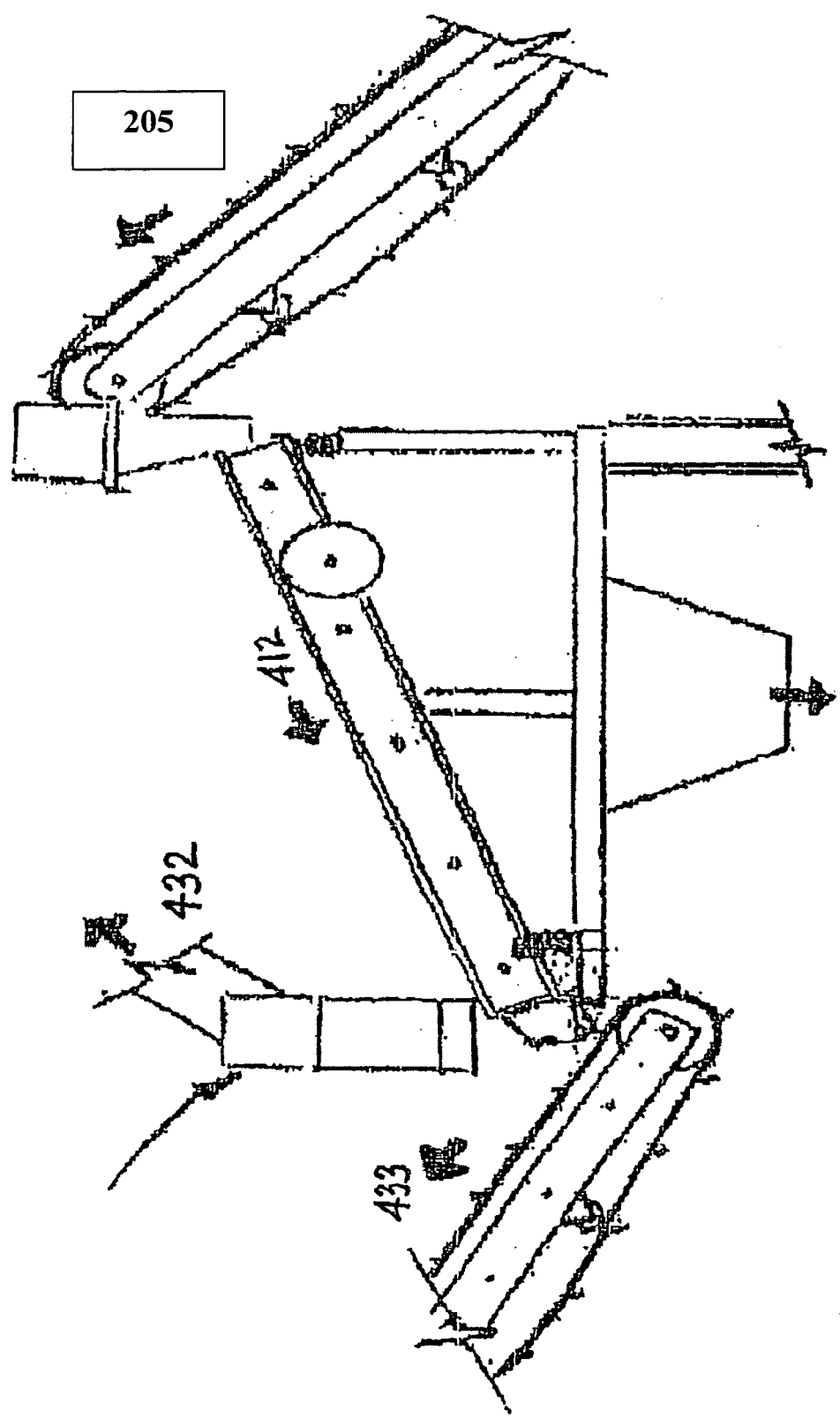
FIG. 4 is a side elevation of the screening system (S2) of the present invention with positive and negative air separation portion.

FIG. 4 is a side elevation, figuratively, of the second classification occurring on a second vibrating screen system (412) as in step 112. The screening system is designed to classify the less than 2.5 inch (NSF) compressed recyclable material, designated Fraction 1, into a qualifying fraction of sub −0.25 inch NSF Glass, Fraction 4, and a qualifying fraction of +0.25 inch to 2.5 inch portion requiring further classification, Fraction 3. The material enters the invention by a conveyor 205; is deposited on the uppermost region of the screen (412) and spread uniformly over the screen using a v-shaped metal separator welded onto the screen 12 inches from the deposit location as in step (111). Separation occurs as the material moves longitudinally across the vibrating mesh screen surface (412). The angle of the system design is optional and depends on design flow rate. Fraction 4, sub −0.25 inch NSF, is deposited in a bin or carried to a bin by an optional conveyor(414).

Figure 5:
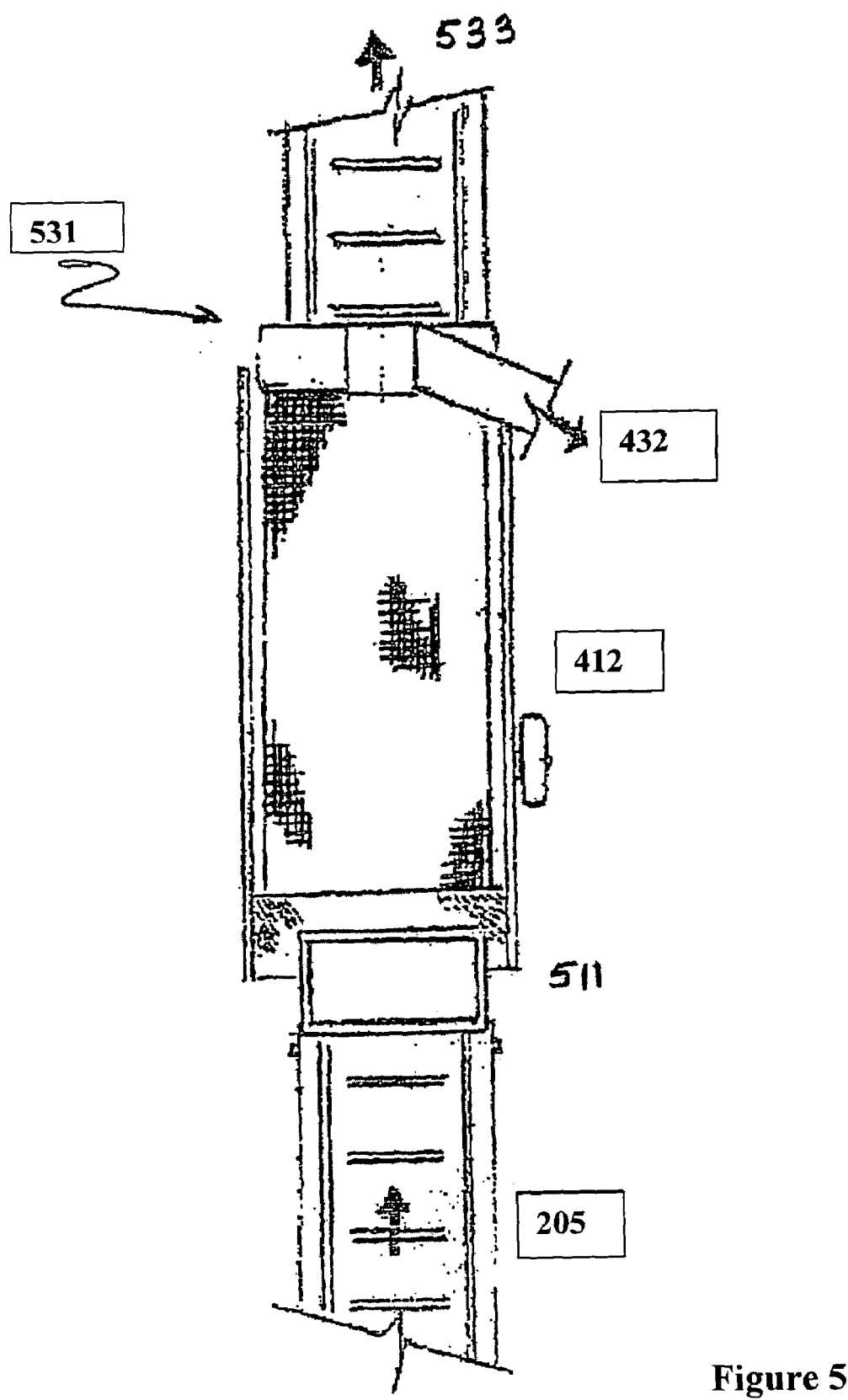
FIG. 5 is a top view of the screening system (S2) of the present invention with positive and negative air separation portion.

FIG. 5 is a top view, figuratively, of the second classification occurring on a second vibrating screen system 412 as in step 112. Step (131), occurring at point (531), is a point of novelty in using an adjustable positive pressure air separation means from below and an adjustable "negative" pressure air from above to separate a light portion 432 from a heavy portion (533).

Figure 6:
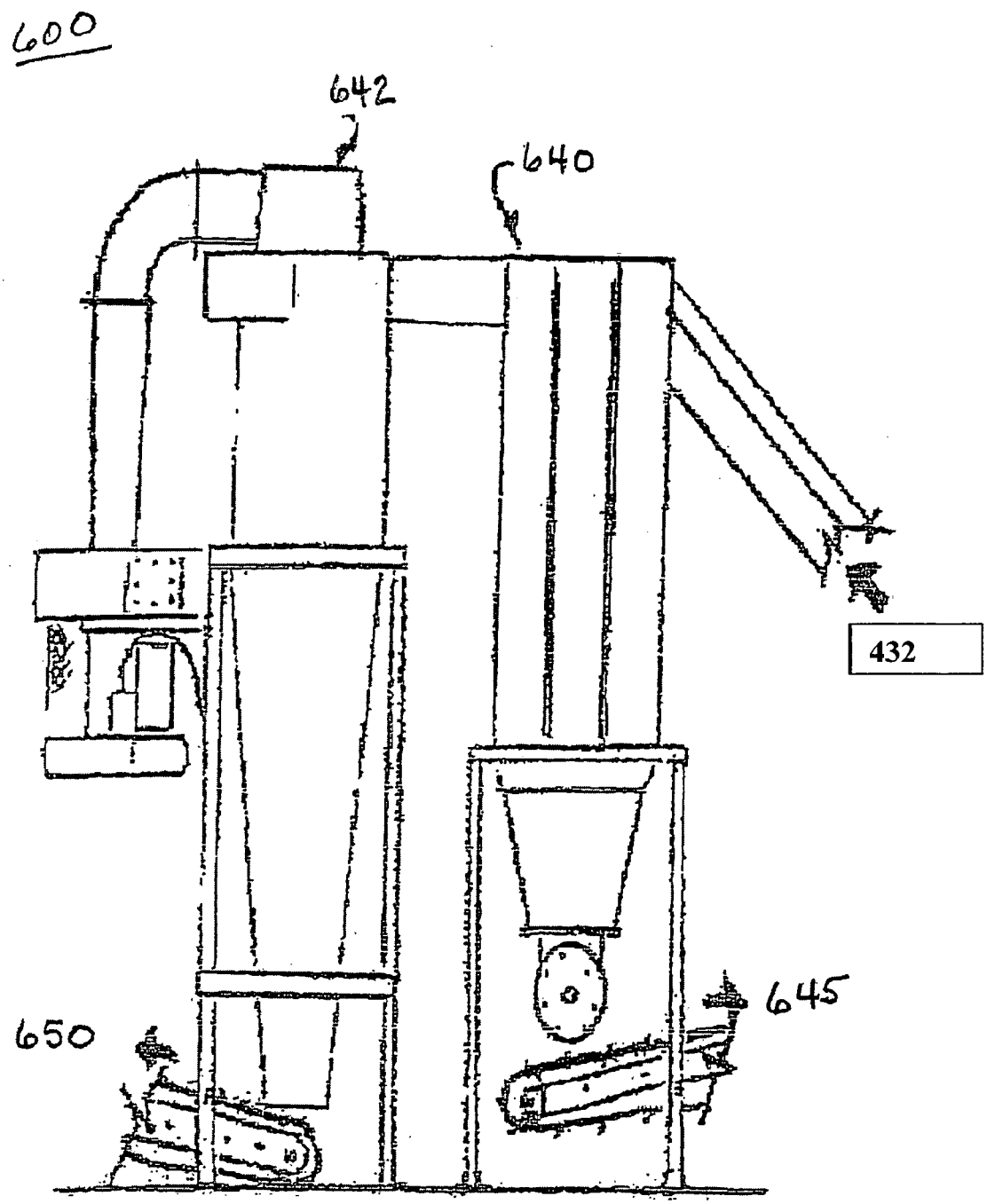
FIG. 6 is a side elevation view of the final air separation portion of the present invention with cyclone and drop box with rotary airlock.

FIG. 6 shows schematically, a second pneumatic separation system performing step (132). The system (600) is designed to separate lightweight, non-glass material from the +{fraction (¼)} inch to −2.5 inch stream at the lowermost position of the second screen 412 feeding into 432 Light, typically paper and waste material is pushed upward off the screening system by positive air pressure and then removed by suction created by a cyclone (642), drop box and rotary airlock air system (640). The heavier portion, having some value, is conveyed (645) to a bin for additional classification or is discarded. The lighter portion (650) is conveyed to the waste area. The lighter portion is typically waste and Styrofoam packing material and small bits of paper; the heavier "light fraction" is typically plastic caps and larger pieces of paper. The unusual combination of the cyclone and drop box facilitates the separation of the waste portion from the marketable portion; this separation is enabled by the first pneumatic separation done at the previous step.

The invention, being a specific sequence of steps and classification processes, enables between 50 and 85% of the initial sub four inch material to be recycled and not added to landfills. The invented apparatus has utility for the waste recycler and benefit to the environment. Previous workers in the field have not understood the advantages of using shaker screens and methodically arranging the sequence of classification to enable economic recovery.

Foregoing described embodiments of the invention are provided as illustrations and descriptions. They are not intended to limit the invention to a precise form as described. In particular, it is contemplated that functional implementation of invention described herein may be implemented equivalently in hardware and/or other available functional components or building blocks. Other variations and embodiments are possible in light of above teachings, and it is thus intended that the scope of invention not be limited by this Detailed Description, but rather by claims following.

We claim:

1. A recycling apparatus comprising:
    first vibrating screen of at least two feet in width with means for classifying compressed material from sub four inch news screen fines between about 6 inches and about 3.5 inches and having a maximum screen open dimension between about 2 inches and 5.5 inches;
    second vibrating screen of predetermined width comprising means for classifying to less than about one inch and having a maximum open dimension between about 0.25 inches and 1.25 inches;
    an adjustable pneumatic separator portion comprising a first air stream flowing up from below and a second air stream being exhausted from above wherein the adjustable pneumatic separator classifies material from sub four inch news screen fines larger than about 0.1 inches and less than about 3.5 inches; and
    a rotary airlock, drop box and cyclone for processing a portion of material from said sub four inch news screen fines; wherein the adjustable pneumatic separator portion is located at the end of the second vibrating screen and supplies the rotary airlock, the drop box and the cyclone wherein the cyclone is after the drop box.

2. The apparatus of claim 1 further comprising a conveyor and a crossbar magnet for additional classification of material from said sub four inch news screen fines.

3. A method for recycling comprising the steps of:
    starting with sub four inch news screen fines compressed material no larger than about 6 inches; classifying to first size less than about 3.5 inches;
    classifying to a second size less than about one inch;
    pneumatically separating with a first air stream flowing up from below and a second air stream exhausting from above;
    adjusting the quantity of the first air stream and the quantity of the second air stream
        wherein the pneumatic separating step classifies sub four inch news screen fines material into a heavy portion and a light portion; and
        processing a portion of material from said sub four inch news screen fines through a rotary airlock, drop box and cyclone.

4. The method of claim 3 further comprising the step of:
    classifying a portion of material from said sub four inch news screen fines with a crossbar magnet.

5. A recycling apparatus comprising:
    a first vibrating screen which classifies sub four inch news screen fines compressed material no larger than about 6 inches into a first portion less than about 3.5 inches in one dimension, and
    a second vibrating screen which classifies the first portion into a second portion less than about one inch in one dimension and transports a remaining third portion to a pneumatic separator,
    a pneumatic separator comprising a first air stream flowing up from below and a second air stream being exhausted from above which classifies the third portion into a heavy portion and a light portion wherein the relative quantities of the first and second air streams are adjustable; and
    a rotary airlock, drop box and cyclone for processing material from said sub four inch news screen fines; wherein the adjustable pneumatic separator is located at the end of the second vibrating screen and supplies the light portion to the rotary airlock, the drop box and the cyclone.

6. The apparatus of claim 5 further comprising a conveyor and a crossbar magnet for additional classification.

* * * * *